US 8,058,211 B2

(12) United States Patent
Cassidy et al.

(10) Patent No.: US 8,058,211 B2
(45) Date of Patent: Nov. 15, 2011

(54) CORROSION INHIBITOR INTENSIFIER COMPOSITIONS AND ASSOCIATED METHODS

(75) Inventors: Juanita M. Cassidy, Duncan, OK (US); Chad E. Kiser, Comanche, OK (US); J. Michael Wilson, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 759 days.

(21) Appl. No.: 12/001,842

(22) Filed: Dec. 12, 2007

(65) Prior Publication Data

US 2009/0156432 A1   Jun. 18, 2009

(51) Int. Cl.
*C09K 8/52* (2006.01)
*C09K 8/524* (2006.01)
*E21B 37/06* (2006.01)

(52) U.S. Cl. ............................ 507/90; 507/939; 166/304
(58) Field of Classification Search .................. 507/267; 166/304, 307
See application file for complete search history.

(56) References Cited

U.S. PATENT DOCUMENTS

| | | | |
|---|---|---|---|
| 2,038,316 A | 4/1936 | Rosenstein | |
| 2,456,947 A | 12/1948 | Jernstedt | |
| 3,094,490 A | 6/1963 | Gardner et al. | |
| 3,124,534 A | 3/1964 | O'Brien et al. | |
| 3,193,506 A | 7/1965 | Joo et al. ...................... 252/138 |
| 3,240,714 A * | 3/1966 | Charanjit ...................... 510/262 |
| 3,416,974 A | 12/1968 | Scott | |
| 3,589,860 A | 6/1971 | Foroulis | |
| 3,627,043 A | 12/1971 | Brown | |
| 3,664,807 A | 5/1972 | Redmore | |
| 3,887,488 A | 6/1975 | Scott et al. | |
| 3,908,759 A | 9/1975 | Cagle et al. | |
| 3,935,289 A | 1/1976 | De Radzitzky d'Ostrowick et al. ............................. 260/660 |
| 4,138,148 A | 2/1979 | Zaremba | |
| 4,448,710 A | 5/1984 | Hort et al. | |
| 4,522,658 A | 6/1985 | Walker | |
| 4,539,122 A | 9/1985 | Son et al. | |
| 4,552,672 A | 11/1985 | Walker et al. | |
| 4,616,719 A | 10/1986 | Dismukes | |
| 4,640,786 A | 2/1987 | Soderquist et al. | |
| 4,710,074 A | 12/1987 | Springer | |
| 4,732,259 A | 3/1988 | Yu et al. | |
| 4,734,259 A | 3/1988 | Frenier et al. | |
| 4,790,958 A | 12/1988 | Teot | |
| 4,871,023 A | 10/1989 | Nigrini et al. | |
| 4,980,074 A | 12/1990 | Henson et al. | |
| 5,002,673 A | 3/1991 | Williams et al. | |
| 5,120,471 A | 6/1992 | Jasinski et al. | |
| 5,366,643 A | 11/1994 | Walker | |
| 5,441,929 A | 8/1995 | Walker | |
| 5,566,760 A | 10/1996 | Harris | |
| 5,591,381 A | 1/1997 | Walker | |
| 5,697,443 A | 12/1997 | Brezinski et al. | |
| 5,763,368 A | 6/1998 | Brezinski ...................... 507/240 |
| 5,976,416 A | 11/1999 | Brezinski | |
| 6,056,896 A | 5/2000 | Brezinski | |
| 6,068,056 A | 5/2000 | Frenier et al. .................. 166/307 |
| 6,117,364 A | 9/2000 | Vorderbruggen et al. | |
| 6,180,057 B1 | 1/2001 | Taylor et al. | |
| 6,192,987 B1 | 2/2001 | Funkhouser et al. | |
| 6,365,067 B1 | 4/2002 | Ahn et al. | |
| 6,399,547 B1 | 6/2002 | Frenier et al. | |
| 6,624,263 B2 | 9/2003 | Matyjaszewski et al. | |
| 7,073,588 B2 | 7/2006 | Cassidy et al. | |
| 7,163,056 B2 | 1/2007 | Cassidy et al. | |
| 7,216,710 B2 | 5/2007 | Welton et al. | |
| 2005/0121114 A1 | 6/2005 | Gonzalez et al. | |
| 2006/0243449 A1 | 11/2006 | Welton et al. .................. 166/307 |
| 2007/0010404 A1 | 1/2007 | Welton et al. | |
| 2007/0071887 A1 | 3/2007 | Cassidy et al. | |
| 2008/0139414 A1 | 6/2008 | Cassidy et al. | |

FOREIGN PATENT DOCUMENTS

| | | |
|---|---|---|
| EP | 0 548 018 A1 | 12/1992 |
| EP | 0 569 884 A1 | 5/1993 |
| EP | 0 593 230 A1 | 4/1994 |
| EP | 1 724 375 A2 | 11/2006 |
| EP | 1 724 375 A3 | 11/2006 |
| GB | 1307727 A * | 2/1973 |
| GB | 2 405 421 A | 7/2004 |
| WO | WO 01/79590 A2 | 4/2001 |
| WO | WO 01/79590 A3 | 10/2001 |
| WO | WO 02/103081 A2 | 12/2002 |
| WO | WO 02/103081 A3 | 12/2002 |
| WO | WO 2006/136262 A1 | 12/2006 |

OTHER PUBLICATIONS

International Search Report and Written Opinion on PCT/GB2008/003936, Nov. 25, 2008.
Halliburton brochure entitled "HAI-404M™ Corrosion Inhibitor", Feb. 2007.
Halliburton brochure entitled "HAI-85M™ Acid-Corrosion Inhibitor", Oct. 2007.
BASF, "Golpanol® PAP", Apr. 2000.
Office Action for U.S. Appl. No. 11/638,190 dated Dec. 29, 2010.
Krzysztof Matyjaszewski, et al.; "Controlled/"Living" Radical Polymerization of Styrene and Methyl Methacrylate Catalyzed by Iron Complexes", Macromolecules, 30, 8161 (1997).
Krzysztof Matyjaszewski, et al.; "Controlled/Living" Radical Polymerization. Kinetics of the Homogeneous Atom Transfer Radical Polymerization of Styrene; J. Am Chem. Soc., 119, 674 (1997).
Yasuhiro Watanabe, et al.; "Ru(Cp*)Cl (PPh3)2: A Versatile Catalyst for Living Radical Polymerization of Methacrylates, Acrylates, and Styrene", Macromolecules, 34, 4370 (2001).

(Continued)

*Primary Examiner* — Timothy J. Kugel
*Assistant Examiner* — Aiqun Li
(74) *Attorney, Agent, or Firm* — Robert A. Kent; McDermott Will & Emery LLP

(57) ABSTRACT

Of the many methods and compositions provided herein, one method includes a method comprising contacting a metal surface with an acidic fluid comprising an aqueous base-fluid, an acid, a corrosion inhibitor, and a corrosion inhibitor intensifier composition comprising a compound that corresponds to a formula $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

18 Claims, No Drawings

OTHER PUBLICATIONS

Tsuyoshi Ando, et al.; "Iron(II) Chloride Complex for Living Radical Polymerization of Methyl Methacrylate", Macromolecules, 30, 4507 (1997).

Jin-Shan Wang, et al.; "Controlled/"Living" Radical Polymerization. Atom Transfer Radical Polymerization in the Presence of Transition-Metal Complexes" J. Am. Chem. Soc., 117, 5614 (1995).

Jin-Shan Wang, et al.; "Controlled/"Living" Radical Polymerization. Halogen Atom Transfer Radical Polymerization Promoted by a Cu(I)/Cu(II) Redox Process"; Macromolecules, 28, 7901 (1995).

Boffardi, Bennett P. "Control of Environmental Variables in Water-Recirculating Systems." Metals Handbook, Ninth Edition, vol. 13 Corrosion. pp. 487-497, 1987.

Masaru Ihara, et al., "The Inhibition of Iron Corrosion in Acid Solutions Using Bismuth(III) Chloride," Corrosion Science, vol. 33, No. 8, pp. 1267-1279 (1992).

T. Hayashi, et al., "The Inhibition Effect of Bismuth(III) Compounds on the Corrosion of Iron in 1 N HCl at Elevated Temperatures," Corrosion Science, vol. 38, No. 6, pp. 867-879 (1996).

XP-002499108 entitled "Organische Verbindungen Einiger Nichtmetalle," by Beyer, H.; Walter, W. (pp. 166-169, 1981).

Troquet, M., et al.: "The Mechanism of the Inhibition of Zinc Corrosion in IN HCl Solution by Tetraphenylphosphonium Bromide," vol. 21, No. 2, 1981.

International Search Report and Written Opinion of International Application No. PCT/GB2007/004708, dated Oct. 12, 2007.

Office Action for U.S. Appl. No. 11/638,190 dated Oct. 8, 2009.

Notice of Allowance and Notice of Allowability for U.S. Appl. No. 11/638,190 dated Jun. 14, 2011.

Office Action for U.S. Appl. No. 11/638,190 dated Jun. 24, 2010.

* cited by examiner

CORROSION INHIBITOR INTENSIFIER COMPOSITIONS AND ASSOCIATED METHODS

BACKGROUND

The present invention relates to methods and compositions for corrosion inhibition. More particularly, in one or more embodiments, the present invention relates to corrosion inhibitor intensifier compositions that may be useful, inter alia, for enhancing the inhibition of metal corrosion in acidic environments, for example, those encountered in subterranean operations such as hydrocarbon recovery, and associated methods of use.

Acidic fluids may be present in a multitude of operations in the oil and chemical industries. In these operations, metal surfaces in piping, tubing, heat exchangers, and reactors may be exposed to acidic fluids. Acidic fluids are often used as a treating fluid in wells penetrating subterranean formations. Such acidic treatment fluids may be used in, for example, clean-up operations or stimulation operations for oil and gas wells. Acidic stimulation operations may use these treatment fluids in hydraulic fracturing and matrix acidizing treatments. As used herein, the term "treatment fluid" refers to any fluid that may be used in an application in conjunction with a desired function and/or for a desired purpose. The term "treatment" does not imply any particular action by the fluid or any component thereof.

Acidizing and fracturing treatments using aqueous acidic treatment fluids commonly are carried out in hydrocarbon-containing subterranean formations penetrated by a well bore to accomplish a number of purposes, one of which is to increase the permeability of the formation. The increase in formation permeability normally results in an increase in the recovery of hydrocarbons from the formation. In acidizing treatments, generally aqueous acidic treatment fluids are introduced into the subterranean formation under pressure so that the acidic solution flows into the pore spaces of the formation. The acidic treatment fluid reacts with acid-soluble materials contained in the formation, resulting in an increase in the size of the pore spaces and an increase in the permeability of the formation. In fracture-acidizing treatments, one or more fractures are produced or enhanced in the formation, and the acidic treatment fluid is introduced into the fracture to etch flow channels in the fracture face. The acid also enlarges the pore spaces in the fracture face and in the formation.

The rate at which acidizing fluids react with reactive materials in the subterranean formation is a function of various factors, including, but not limited to, acid concentration, temperature, fluid velocity, and the type of reactive material encountered. Whatever the rate of reaction of the acidizing fluid, the fluid can be introduced into the formation only a certain distance before it becomes spent. It is desirable to maintain the acidizing fluid in a reactive condition for as long a period of time as possible to maximize the permeability enhancement produced by the acidizing fluid.

A common problem associated with using acidic treatment fluids in subterranean formations is the corrosion of the tubular goods in the well bore and the other equipment used to carry out the treatment. As used herein, the term "corrosion" refers to any reaction between a material and its environment that causes some deterioration of the material or its properties. Examples of common types of corrosion include, but are not limited to, the rusting of metal, the dissolution of a metal in an acidic solution, and patina development on the surface of a metal. The expense of repairing or replacing corrosion damaged equipment is high. The corrosion problem may be exacerbated by the elevated temperatures encountered in deeper formations. The increased corrosion rate of the ferrous and other metals making up the tubular goods and other equipment results in quantities of the acidic solution being neutralized before it ever enters the subterranean formation. The partial neutralization of the acid results in the production of quantities of metal ions which are highly undesirable in the subterranean formation. Acidic treatment fluids may include a variety of acids such as, for example, hydrochloric acid, formic acid, hydrofluoric acid, and the like. While acidic treatment fluids may be useful for a variety of downhole operations, acidic treatment fluids can be problematic in that they can cause corrosion to downhole production tubing, downhole tools, and other surfaces in a subterranean formation.

To combat potential corrosion problems, an assortment of corrosion inhibitors has been used to reduce or prevent corrosion to downhole metals and metal alloys with varying levels of success. As used herein, the term "inhibit" and its derivatives refer to lessening the tendency of a phenomenon to occur and/or the degree to which that phenomenon occurs. The term "inhibit" does not imply any particular degree or amount of inhibition. A difficulty encountered with the use of some corrosion inhibitors is the limited temperature range over which they may function effectively. For instance, certain conventional antimony-based inhibitor formulations have been limited to temperatures above 270° F. and do not appear to function effectively below this temperature.

Corrosion inhibitor intensifiers have been used to extend the performance range of a selected acid corrosion inhibitor. As used herein, the term "corrosion inhibitor intensifier" refers to compounds that are capable of enhancing the performance of a selected acid corrosion inhibitor. Unfortunately, most intensifiers do not perform universally with all corrosion inhibitors and many have temperature, time, and environmental drawbacks. For instance, formic acid, which is sometimes used as a corrosion inhibitor intensifier, is limited by a temperature range in which it performs of about 250° F. up to about 325° F. in 15% HCl. Potassium iodide is another intensifier that is sometimes used. It also has temperature limitations of about 325° F. that limit its usefulness. Additionally, some intensifiers, such as antimony-based intensifiers, can be used in conjunction with 15% HCl, but not with stronger acids such as 28% HCl. Another intensifier, cuprous iodide, is effective up to about 350° F., but has limited solubility in acid solutions. Additionally, cuprous iodide contains copper, a banned substance in some areas due to environmental considerations.

SUMMARY

The present invention relates to methods and compositions for corrosion inhibition. More particularly, in one or more embodiments, the present invention relates to corrosion inhibitor intensifier compositions that may be useful, inter alia, for enhancing the inhibition of metal corrosion in acidic environments, for example, those encountered in subterranean operations such as hydrocarbon recovery, and associated methods of use.

In one embodiment, the present invention provides a method comprising: contacting a metal surface with an acidic fluid comprising an aqueous base-fluid, an acid, a corrosion inhibitor, and a corrosion inhibitor intensifier composition comprising a compound that corresponds to a formula $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

In one embodiment, the present invention provides a method comprising: introducing an acidic fluid into a well bore via a metal conduit, wherein the acidic fluid comprises an aqueous-base fluid, an acid, a corrosion inhibitor, and a corrosion inhibitor intensifier composition comprising a compound that corresponds to a formula $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

In one embodiment, the present invention provides a method comprising: providing an acidic fluid comprising an aqueous-base fluid, an acid, a corrosion inhibitor, and a precursor to a compound that corresponds to a formula $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; allowing the compound that corresponds to the formula $R_1R_2XCCOOH$ to generate from the precursor; and contacting a metal surface with the acidic fluid.

In one embodiment, the present invention provides an acidic treatment fluid comprising: an aqueous-base fluid; an acid; a corrosion inhibitor; and a corrosion inhibitor intensifier composition comprising a compound that corresponds to a formula $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group group, and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

In one embodiment, the present invention provides a composition comprising: a corrosion inhibitor; and a corrosion inhibitor intensifier composition comprising a compound that corresponds to a formula $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for corrosion inhibition. More particularly, in one or more embodiments, the present invention relates to corrosion inhibitor intensifier compositions that may be useful, inter alia, for enhancing the inhibition of metal corrosion in acidic environments, for example, those encountered in subterranean operations such as hydrocarbon recovery, and associated methods of use.

One of the many advantages of the present invention is that the corrosion inhibitor intensifier compositions of the present invention may be more effective than corrosion inhibitors and intensifiers heretofore used and/or may possess desirable environmental properties for use in downhole environments in some areas, such as those that may be subject to more stringent environmental regulations. Another potential advantage of the corrosion inhibitor intensifier compositions of the present invention is that they may be more effective according to time and temperature over other intensifiers.

The corrosion inhibitor intensifier compositions of the present invention comprise a compound that corresponds to a formula: $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group. Some examples include, but are not limited to, 2-halo-2,2-dialkylacetic acid, 2-halo-2,2-diphenylacetic acid, 2-halo-2,2-dibutyrylacetic acid, 2-bromo-isobutyric acid, 2-chloro-2,2-diphenylacetic acid, 2-chloro-2,2-dimethylacetic acid, 2-chloro-2,2-diethylacetic acid, and combinations thereof. The compositions may include other intensifiers such as hexamethylenetetramine, if desired. Although not wanting to be limited by any theory in particular, when certain of the corrosion intensifier compositions (e.g., 2-halo-2,2-dialkylacetic acid) are used, for example, it is presently believed that the corrosion inhibitor composition may be reduced in the presence of a metal surface to a ketene. It is believed that the ketene may then participate in polymerization reactions, such as those of cinnamaldehyde or propargyl alcohol, occurring at the metal surface. This mechanism may only be pertinent if used with a corrosion inhibitor that has a polymerizable component. This same theory may apply to other embodiments disclosed herein.

As will be appreciated by those of ordinary skill in the art, with the benefit of this disclosure, the compounds corresponding to the formula $R_1R_2XCCOOH$ that are used in certain embodiments may be prepared using a variety of techniques. For example, compounds corresponding to the formula $R_1R_2XCCOOH$ may be prepared from a precursor compound that corresponds to the formula $R_3R_4X_1CCOX_2$, wherein $X_1$ is a halogen; $X_2$ is a halogen, an oxyalkyl, or an oxyaryl, $R_3$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_4$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group. If $X_2$ is a halogen, the compound that corresponds to the formula $R_3R_4X_1CCOX_2$ is an acyl halide. If $X_2$ is an oxyaryl, the compound that corresponds to the formula $R_3R_4X_1CCOX_2$ is an ester. In certain embodiments, compounds corresponding to the formula $R_1R_2XCCOOH$ may comprise a hydrolysis product of the precursor compound that corresponds to the formula $R_3R_4X_1CCOX_2$. For example, a method of preparing a corrosion inhibitor intensifier composition of the present invention from an acyl halide or an ester may involve refluxing in a strong acid, such as 15% by weight HCl, for a period of about 16 hours, or until the acyl halide or ester is completely hydrolyzed to the acid.

By way of further example, compounds corresponding to the formula $R_1R_2XCCOOH$ may be prepared from a precursor compound that corresponds to the formula $R_5R_6X_3CCOOX_4$, wherein $X_3$ is a halogen, $X_4$ is a monovalent cation, $R_5$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_6$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group. In certain embodiments, compounds corresponding to the formula $R_1R_2XCCOOH$ may comprise a dissolution product of the precursor compound that corresponds to the formula $R_5R_6X_3CCOOX$.

The corrosion inhibitor intensifier compositions comprising a compound corresponding to the formula $R_1R_2XCCOOH$ prepared in accordance with embodiments the present invention may utilized with a number of different techniques enhance the performance of corrosion inhibitors, in accordance with embodiments of the present invention. In certain embodiments, a corrosion inhibitor intensifier composition may be combined with a corrosion inhibitor and then added to a treatment fluid, such as an acidic treatment fluid. In certain embodiments, a corrosion inhibitor intensifier composition may be included in an acidic treatment fluid, wherein the acidic treatment fluid comprises an acid, a corrosion inhibitor, and the corrosion inhibitor intensifier composition. In certain embodiments, one or more of the precursor compounds as described above may be combined with the corrosion inhibitor and/or included in the acidic treatment fluid. Thereafter, the precursor compound may be allowed to hydrolyze (such as under conditions present in a well bore) to generate the compound corresponding to the formula $R_1R_2XCCOOH$ in the corrosion inhibitor intensifier compositions of the present invention. This may be desirable, for example, where the compounds corresponding to the formula $R_1R_2XCCOOH$ in the corrosion inhibitor intensifier compositions of the present invention are not compatible with the corrosion inhibitor. The addition of one or more precursor compounds to the treatment fluid also may be desirable in an offshore platform where the inhibitor delivery lines are long, such that the $R_1R_2X_1CCOOH$ formulation may be available only when it reaches the well bore. In certain embodiments, one or more precursor compounds may be added to the treatment fluid such that the corrosion inhibitor only becomes available as the pumped fluid heats up in the well bore, e.g., only at the higher temperatures where it is needed.

As set forth above, the corrosion inhibitor compositions of the present invention may be included in an acidic treatment fluid. Generally, the treatment fluids of the present invention may comprise an aqueous-base fluid, an acid, a corrosion inhibitor, and a corrosion inhibitor intensifier composition. The corrosion inhibitor intensifier compositions of the present invention may be present in the treatment fluid in an amount in the range of about 0.005% to about 5% by weight of the treatment fluid. In some embodiments, the intensifier may be present in an amount in the range of about 0.1% to about 2% by weight of the treatment fluid. The amount used may vary depending on conditions present at the metal's surface, temperature, contact time, solubility of the corrosion inhibitor compound in the acid present, the acid strength, the composition of the corrosion inhibitor compound, and other factors relevant to those skilled in the art.

The aqueous-base fluids used in the treatment fluids of the present invention may comprise fresh water, saltwater (e.g., water containing one or more salts dissolved therein), brine, seawater, or combinations thereof. Generally, the water may be from any source, provided that it does not contain an excess of components that might undesirably affect the stability and/or performance of the treatment fluids. One of ordinary skill in the art, with the benefit of this disclosure, will recognize what components might undesirably affect the stability and/or performance of the treatment fluids of the present invention. In certain embodiments, the aqueous-base fluid may be emulsified into a nonaqueous fluid. The aqueous-base fluid may also be viscosified with an acid stable gelling agent, such as, for example, a polymer, which may also include a crosslinker. In certain embodiments, the aqueous-base fluid may also be foamed.

The acid that may be present in the acidic treatment fluids of the present invention may include, but is not limited to, organic acids, mineral acids (such as hydrochloric acid, hydrofluoric acid, and the like), and mixtures of these acids. In certain embodiments, hydrochloric acid may be present in a range of about 5% to 28% by weight of the treatment fluid. Additionally, a variety of weak acids can be used in accordance with embodiments of the present invention. Examples of suitable weak acids include, but are not limited to, formic acid, acetic acid, citric acid, glycolic acid, hydroxyacetic acid, lactic acid, hydrofluoric acid, 3-hydroxypropionic acid, carbonic acid, ethylenediaminetetraacetic acid, and mixtures of these acids. The acid may be present in an amount in the range of about 1% to about 37% by weight of the treatment fluid. In certain embodiments, the acid may be present in an amount in the range of about 5% to about 28% by weight of the treatment fluid. The amount of the acid(s) included in a particular treatment fluid of the present invention may depend upon, for example, the desired purpose or use of the treatment fluid, the particular acid used, as well as other components of the treatment fluid, and/or other factors that will be recognized by one of ordinary skill in the art with the benefit of this disclosure.

The acidic treatment fluids of the present invention further may include a corrosion inhibitor. Any of a variety of corrosion inhibitors may be suitable for use in the compositions and methods of the present invention. Examples of suitable corrosion inhibitors, include, but are not limited to, cinnamaldehyde compounds, acetylenic compounds, a condensation reaction product as set forth below, and combinations thereof. While the amount of corrosion inhibitor utilized in the practice of the present invention can vary over a substantial range, the corrosion inhibitor may present in an amount effective to inhibit corrosion by the acid on the metal surfaces to be protected. In certain embodiments, the corrosion inhibitor may be present in an amount of about 0.05% to about 3% by weight of the treatment fluid.

In certain embodiments, corrosion inhibitor compositions useful in the present invention may comprise a cinnamaldehyde compound. The term "cinnamaldehyde compound" as used herein refers to cinnamaldehyde and cinnamaldehyde derivatives. Cinnamaldehyde derivatives may include any compound that may act as a source of cinnamaldehyde in mixtures encountered during use of the corrosion inhibitors. Examples of cinnamaldehyde derivatives suitable for use in the present invention include, but are not limited to, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde, o-methylsulfate, p-thiocyanocinnamaldehyde, p-(S-acetyl)thiocinnamaldehyde, p-(S—N, N-dimethylcarbamoylthio)cinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p- cyanocinnamaldehyde, α-ethyl-p-methylcinnamaldehyde, p-methyl-α-pentylcinnamaldehyde, cinnamaloxime, cinnamonitrile, 5-phenyl-2,4-pentadienal, 7-phenyl-2,4,6-heptatrienal, and mixtures thereof.

Where used, the cinnamaldehyde compound may be present in an amount in the range of about 0.005% to about 5% by weight of the treatment fluid. In certain embodiments, cinnamaldehyde compound may be present in an amount in the range of about 0.02% to about 1% by weight of the treatment fluid.

In certain embodiments, the corrosion inhibitor compositions useful in the present invention may comprise an acetylenic compound. Acetylenic compounds suitable for use in the present invention may include acetylenic alcohols such as, for example, acetylenic compounds having the general formula: $R_7CCCR_8R_9OH$ wherein $R_7$, $R_8$, and $R_9$ are individually selected from the group consisting of hydrogen, alkyl, phenyl, substituted phenyl hydroxy-alkyl radicals. In certain embodiments, $R_7$ comprises hydrogen. In certain embodiments, $R_8$ comprises hydrogen, methyl, ethyl, or propyl radicals. In certain embodiments, $R_9$ comprises an alkyl radical having the general formula $C_nH_{2n}$, where n is an integer from 1 to 10. In certain embodiments, the acetylenic compound $R_7CCCR_8R_9OR_{10}$ may also be used where $R_{10}$ is a hydroxyalkyl radical. Examples of acetylenic alcohols suitable for use in the present invention include, but are not limited to, methyl butynol, methyl pentynol, hexynol, ethyl octynol, propargyl alcohol, benzylbutynol, ethynylcyclohexanol, ethoxy acetylenics, propoxy acetylenics, and mixtures thereof. Examples of suitable alcohols include, but are not limited to, hexynol, propargyl alcohol, methyl butynol, ethyl octynol, propargyl alcohol ethoxylate (e.g., Golpanol PME), propargyl alcohol propoxylate (e.g., Golpanol PAP), and mixtures thereof. When used, the acetylenic compound may be present in an amount of about 0.01% to about 10% by weight of the treatment fluid. In certain embodiments, the acetylenic compound may be present in an amount of about 0.1% to about 1.5% by weight of the treatment fluid.

In certain embodiments, corrosion inhibitor compositions useful in the present invention may optionally comprise a condensation reaction product. As referred to herein, the condensation reaction product in this blend is hereby defined to include the reaction product of effective amounts of one or more active hydrogen containing compounds with one or more organic carbonyl compound having at least one hydrogen atom on the carbon atom alpha to the carbonyl group and a fatty acid or other fatty compound or alkyl nitrogen heterocycles and preferably 2 or 4 alkyl substituted and an aldehyde, and, in certain embodiments, those aldehydes that may comprise aliphatic aldehydes containing from 1 to 16 carbons and aromatic aldehydes having no functional groups that are reactive under the reaction conditions other than aldehydes. The above ingredients may be reacted in the presence of an acid catalyst of sufficient strength to thereby form the reaction product. These condensation reaction products are described in more detail in U.S. Pat. No. 5,366,643, the entire disclosures of which are hereby incorporated by reference.

An example of one method of preparing the reaction product may be to react about 1 equivalent of active hydrogen compound and about 0.5 to about 10 equivalents of aldehyde and about 0.6 to about 10 equivalents of carbonyl compound and about 0.8 to about 1.2 equivalents of mineral acid catalyst with about 0.15 to about 10 equivalents of fatty compound at a temperature in the range of about 140° F. to about 240° F. for a time in the range of about 4 to about 48 hours. Upon completion of the reaction, additional fatty material may be added with stirring to bring the ratio of fatty material to a level of about 2 to about 20 equivalents.

In some embodiments, the reaction product may be present in the range of about 3% to about 75% by weight of the corrosion inhibitor. In certain embodiments, the reaction product may be present in an amount in the range of about 15% to about 30% by weight of the corrosion inhibitor.

In certain embodiments, combinations of the corrosion inhibitors disclosed herein, as well as additional corrosion inhibitor compounds and corrosion inhibitor intensifiers, may be used. Additional corrosion inhibitor components, such as solvents, surfactants, and other corrosion inhibitor intensifiers that may be suitable are further discussed in U.S. Pat. Nos. 5,697,443 and 5,591,381, the entire disclosures of which are hereby incorporated by reference.

The treatment fluids of the present invention optionally may include one or more of a variety of additives, such as salts, surfactants, solvents, scale inhibitors, organic corrosion inhibitors, catalysts, clay stabilizers, friction reducers, gases, foaming agents, iron control agents, solubilizers, pH adjusting agents (e.g., buffers), and the like. Combinations of these may be used as well. Those of ordinary skill in the art, with the benefit of this disclosure, will be able to determine the appropriate additives for a particular application.

The acidic treatment fluids of the present invention may be prepared using any of a variety of suitable techniques. For example, the acidic treatment fluids may be prepared by blending at least the aqueous-base fluid and the acid to provide an acidic treatment fluid of a desired acid concentration. The corrosion inhibitor and the corrosion inhibitor intensifier composition may then be blended with the acidic treatment fluid in a desired amount. As set forth above, the corrosion inhibitor intensifier composition may be premixed with the corrosion inhibitor prior to preparation of the acidic treatment fluid, in accordance with embodiments of the present invention. In addition, rather than blending the compound corresponding to the formula $R_1R_2XCCOOH$ of corrosion inhibitor intensifier composition in the acidic treatment fluid, a precursor compound to the $R_1R_2XCCOOH$ formulation may be blended with the acidic treatment fluid and/or premixed with the corrosion inhibitor. If desired, the treatment fluids of the present invention can be prepared in any suitable tank equipped with suitable mixing means. The treatment fluids may be transferred either at a controlled rate directly into a well bore or into a convenient storage tank for injection down a well bore, in accordance with embodiments of the present invention.

In some embodiments, the acidic treatment fluid may be introduced into a subterranean formation whereby either foreign material in the well bore or in the formation or formation materials are dissolved to thereby increase the permeability of the formation (e.g., in an acidizing treatment). The increased permeability generally should permit better flow of hydrocarbon fluids through the formation and into its well bore. The pumping rate and pressure utilized will depend upon, for example, the characteristics of the formation and whether or not fracturing of the formation is desired. After the treatment fluid has been placed in the formation, the well may be shut in and allowed to stand for a period of several hours or more depending on the type of acid employed and the formation treated. If there is pressure on the well, pressure then can be released and the spent or at least partially spent acidic treatment fluid, containing salts formed by the reaction of the acid, is permitted to flow back into the well bore and is pumped or flowed to the surface for appropriate disposal, in accordance with embodiments of the present invention. The well then may be placed on production or used for other purposes.

Generally, some of the methods of the present invention involve inhibiting the corrosion of a portion of a metal surface. The methods of the present invention may be employed in a variety of applications, including those conducted in subterranean formations. In one embodiment, the present invention provides a method comprising: contacting a metal surface with a treatment fluid comprising an aqueous-base fluid, an acid, a corrosion inhibitor, and a corrosion inhibitor intensifier composition comprising a compound that corresponds to a formula $R_1R_2XCCOOH$, wherein X is a halogen, $R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group, and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group. In certain embodiments the compound that corresponds to a formula $R_1R_2XCCOOH$ may be generated from one or more precursor compounds. The metals suitable for use with the corrosion inhibitor intensifier compounds of the present invention include ferrous-based metals such as iron and alloys of iron, for example, N-80, J-55, 13Cr and 22Cr, and non-ferrous metals such as aluminum, zinc, nickel, and copper, and their alloys. Other metals that can be protected from corrosion by the present invention are also contemplated. Such metal surfaces may be part of downhole piping, downhole tools, and the like.

To facilitate a better understanding of the present invention, the following examples of certain aspects of some embodiments are given. In no way should the following examples be read to limit, or define, the entire scope of the invention.

EXAMPLES

Table 1 lists data from experiments performed to determine the effect of certain corrosion inhibitors on the corrosion of N-80 steel when used in combination with certain corrosion inhibitor intensifier compositions and hydrochloric acid. The corrosion inhibitors used in these tests were HAI-GE (a propargyl alcohol based corrosion inhibitor available from Halliburton Energy Services, Duncan, Okla.) and cinnamaldehyde ("CMA"). The corrosion inhibitor intensifier compositions used in these tests were 2-chloro-2,2-diphenylacetic acid ("CDACOOH") and 2-bromo-isobutyric acid. Precursors to these two acids were also tested, 2-chloro-2,2-diphenylacetyl chloride ("CDAC") and 2-bromo-isobutyryl bromide. The 2-chloro-2,2-diphenylacetic acid utilized in these tests was synthesized by refluxing 2.0 g of CDAC in 100 mL 15% HCl for 16 hours. The resulting white solid was vacuum filtered and washed with deionized water. For comparative purposes, diphenyl acetic acid was also used as a corrosion inhibitor intensifier composition.

The corrosion loss data was generated for N-80 steel using the weight loss method. Coupon specimens (~4.4 in$^2$) were cleaned and weighed prior to their immersion in 100 mL of the acid blended with additives. Autoclaves containing the test fluids with the alloy specimens were pressurized to 1000 psi and then heated to test temperature for the contact time indicated. Following the test, any residues were cleaned from the specimens and the difference in weight was recorded and converted to pounds per square foot losses.

TABLE 1

| Temp (F.) | Acid | Time (hr) | Coupon | Inhibitor (v/v) | Additive | Corrosion Loss (lb/ft$^2$) |
|---|---|---|---|---|---|---|
| 250 | 15% HCl | 3 | N-80 | 2.0% HAI-GE | — | 0.33 |
| 250 | 15% HCl | 3 | N-80 | 2.0% HAI-GE | 1.0 g (4.1 mmol) CDACOOH | 0.030, 0.050 |
| 250 | 15% HCl | 3 | N-80 | 2.0% HAI-GE | 0.8 g (3.8 mmol) diphenylacetic acid | 0.260 |
| 250 | 7.5% HCl | 3 | N-80 | 2.0% CMA | — | 0.252 |
| 250 | 7.5% HCl | 3 | N-80 | 2.0% CMA | 0.340 g (1.4 mmol) CDACOOH | 0.190 |
| 250 | 15% HCl | 3 | N-80 | 2.0% CMA | — | 0.664 |
| 250 | 15% HCl | 3 | N-80 | 2.0% CMA | 1.0 g (4.1 mmol) CDACOOH | 0.132 |
| 200 | 28% HCl | 3 | N-80 | 2.0% CMA | — | 0.165 |
| 200 | 28% HCl | 3 | N-80 | — | 1.0 g (4.1 mmol) CDACOOH | 0.538 |
| 200 | 28% HCl | 3 | N-80 | 2.0% CMA | 1.0 g (4.1 mmol) CDACOOH | 0.050 |
| 200 | 28% HCl | 3 | N-80 | 2.0% CMA | 1.08 g (4.1 mmol) CDAC | 0.276 |
| 200 | 28% HCl | 3 | N-80 | 2.0% CMA | 0.5 ml (4.1 mmol) 2-bromo-isobutyric acid | 0.044, 0.036 |
| 200 | 28% HCl | 3 | N-80 | 2.0% CMA | 0.5 ml (4.1 mmol) 2-bromo-isobutyryl bromide | 0.228 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "about a to about b," or, equivalently, "approximately a to b," or, equivalently, "approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   contacting a metal surface with an acidic fluid comprising an aqueous base-fluid, an acid, a corrosion inhibitor, and a corrosion inhibitor intensifier composition comprising a compound that corresponds to a formula $R_1R_2XCCOOH$, wherein:

X is a halogen;

$R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

2. The method of claim 1 wherein the metal surface is located within a well bore that penetrates a subterranean formation.

3. The method of claim 1 wherein the fluid is foamed.

4. The method of claim 1 wherein the fluid is introduced into a subterranean formation as part of an acidizing treatment.

5. The method of claim 1 wherein the compound that corresponds to the formula $R_1R_2XCCOOH$ is generated from a precursor compound that comprises at least one compound selected from the group consisting of a compound that corresponds to a formula $R_3R_4X_1CCOX_2$, a compound that corresponds to a formula $R_5R_6X_3CCOOX_4$, and combinations thereof, wherein:

$X_1$ and $X_3$ are halogens;

$X_2$ comprises at least one group selected from the group consisting of a halogen group, an oxyalkyl group, and an oxyaryl group;

$X_1$, $X_2$, and $X_3$ may or may not be equal;

$X_4$ is a monovalent cation;

$R_3$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and $R_4$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group;

$R_5$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and $R_6$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

6. The method of claim 1 wherein the corrosion inhibitor intensifier composition comprises at least one compound selected from the group consisting of a 2-halo-2,2-dialkylacetic acid, a 2-halo-2,2-diphenylacetic acid, a 2-halo-2,2-dibutyrylacetic acid, 2-bromo-isobutyric acid, 2-chloro-2,2-diphenylacetic acid, and combinations thereof.

7. The method of claim 1 wherein the acid comprises at least one acid selected from the group consisting of hydrochloric acid, hydrofluoric acid, an organic acid, a mineral acid, formic acid, acetic acid, citric acid, glycolic acid, hydroxyacetic acid, lactic acid, 3-hydroxypropionic acid, carbonic acid, ethylenediaminetetraacetic acid, and combinations thereof.

8. The method of claim 1 wherein the corrosion inhibitor comprises at least one compound selected from the group consisting of a cinnamaldehyde compound, an acetylenic compound, a condensation reaction product, and combinations thereof.

9. The method of claim 1 comprising combining at least the corrosion inhibitor intensifier composition and the corrosion inhibitor, prior to preparing the acidizing fluid.

10. The method of claim 1 comprising combining at least the corrosion inhibitor and a precursor to the compound that corresponds to the formula $R_1R_2XCCOOH$, prior to preparing the acidizing fluid.

11. A method comprising:

introducing an acidic fluid into a well bore via a metal conduit, wherein the acidic fluid comprises an aqueous-base fluid, an acid, a corrosion inhibitor, and a corrosion inhibitor intensifier composition comprising a compound that corresponds to a formula $R_1R_2XCCOOH$, wherein:

X is a halogen;

$R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and $R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

12. The method of claim 11 wherein the acidic fluid is introduced into the well bore as part of an acidizing treatment.

13. The method of claim 11 wherein the compound that corresponds to the formula $R_1R_2XCCOOH$ is generated from a precursor compound that comprises at least one compound selected from the group consisting of a compound that corresponds to a formula $R_3R_4X_1CCOX_2$, a compound that corresponds to a formula $R_5R_6X_3CCOOX_4$, and combinations thereof, wherein:

$X_1$ and $X_3$ are halogens;

$X_2$ comprises at least one group selected from the group consisting of a halogen group, an oxyalkyl group, and an oxyaryl group;

$X_1$, $X_2$, and $X_3$ may or may not be equal;

$X_4$ is a monovalent cation;

$R_3$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and $R_4$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group;

$R_5$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and $R_6$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

14. The method of claim 11 wherein the corrosion inhibitor intensifier composition comprises at least one compound selected from the group consisting of a 2-halo-2,2-dialkylacetic acid, a 2-halo-2,2-diphenylacetic acid, a 2-halo-2,2-dibutyrylacetic acid, 2-bromo-isobutyric acid, 2-chloro-2,2-diphenylacetic acid, and combinations thereof.

15. The method of claim 11 wherein the acid comprises at least one acid selected from the group consisting of hydrochloric acid, hydrofluoric acid, an organic acid, a mineral acid, formic acid, acetic acid, citric acid, glycolic acid, hydroxyacetic acid, lactic acid, 3-hydroxypropionic acid, carbonic acid, ethylenediaminetetraacetic acid, and combinations thereof.

16. The method of claim 11 wherein the corrosion inhibitor comprises at least one compound selected from the group consisting of a cinnamaldehyde compound, an acetylenic compound, a condensation reaction product, and combinations thereof.

17. A method comprising:
providing an acidic fluid comprising an aqueous-base fluid, an acid, a corrosion inhibitor, and a precursor to a compound that corresponds to a formula $R_1R_2XCCOOH$, wherein:
X is a halogen;
$R_1$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and
$R_2$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group;
allowing the compound that corresponds to the formula $R_1R_2XCCOOH$ to generate from the precursor; and
contacting a metal surface with the acidic fluid.

18. The method of claim 17 wherein the precursor comprises at least one compound selected from the group consisting of a compound that corresponds to a formula $R_3R_4X_1CCOX_2$, a compound that corresponds to a formula $R_5R_6X_3CCOOX_4$, and combinations thereof, wherein:
$X_1$ and $X_3$ are halogens;
$X_2$ comprises at least one group selected from the group consisting of a halogen group, an oxyalkyl group, and an oxyaryl group;
$X_1$, $X_2$, and $X_3$ may or may not be equal;
$X_4$ is a monovalent cation;
$R_3$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and
$R_4$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group;
$R_5$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group; and
$R_6$ comprises at least one group selected from the group consisting of a $C_1$-$C_{20}$ alkyl group, a $C_3$-$C_{20}$ cycloalkyl group, a $C_1$-$C_{20}$ oxyalkyl, and a $C_6$-$C_{20}$ aryl group.

\* \* \* \* \*